United States Patent [19]

Marquis et al.

[11] Patent Number: 5,290,527
[45] Date of Patent: Mar. 1, 1994

[54] MOLYBDENUM RECOVERY

[75] Inventors: Edward T. Marquis; Howard F. Payton, both of Austin, Tex.; Robert A. Meyer, Ballwin, Mo.

[73] Assignee: Texaco Chemical Company, White Plains, N.Y.

[21] Appl. No.: 971,741

[22] Filed: Nov. 5, 1992

[51] Int. Cl.$^5$ .............................................. C01G 39/00
[52] U.S. Cl. ......................................... 423/54; 423/53
[58] Field of Search ...................................... 423/53, 54

[56] References Cited

U.S. PATENT DOCUMENTS

| | | | |
|---|---|---|---|
| 3,350,422 | 10/1967 | Kollar | 260/348.5 |
| 3,351,635 | 11/1967 | Kollar | 260/348.5 |
| 3,362,972 | 1/1968 | Kollar | 260/414 |
| 3,434,975 | 3/1969 | Sheng et al. | 252/431 |
| 3,453,218 | 7/1969 | Sheng et al. | 252/431 |
| 3,480,563 | 11/1969 | Bonetti et al. | 252/431 |
| 3,573,226 | 3/1971 | Sorgenti | 252/431 |
| 3,578,690 | 5/1971 | Becker | 260/414 |
| 3,763,303 | 10/1973 | Khuri et al. | 423/54 |
| 3,784,482 | 1/1974 | Cavitt | 252/431 |
| 3,787,379 | 1/1974 | Ferren et al. | 260/87.5 A |
| 3,819,663 | 6/1974 | Levine et al. | 260/348.52 |
| 3,931,044 | 1/1976 | Maurin | 252/414 |
| 3,953,362 | 4/1976 | Lines et al. | 252/431 |
| 3,991,090 | 11/1976 | Hagstrom et al. | 260/429 |
| 4,009,122 | 2/1977 | Lines et al. | 252/431 |
| 4,046,783 | 9/1977 | Cavitt | 260/348.33 |
| 4,315,896 | 2/1982 | Taylor | 423/54 |
| 4,317,801 | 3/1982 | Taylor | 423/54 |
| 4,328,191 | 5/1982 | Su | 423/54 |
| 4,374,100 | 2/1983 | Sebenik et al. | 423/56 |
| 4,455,283 | 6/1984 | Sweed | 423/53 |
| 4,485,074 | 11/1984 | Poenisch | 423/55 |
| 4,598,057 | 7/1986 | Isaacs | 502/24 |
| 4,626,596 | 12/1987 | Marquis et al. | 556/57 |
| 4,650,886 | 3/1987 | Marquis et al. | 556/57 |
| 4,654,427 | 3/1987 | Marquis et al. | 556/57 |
| 4,703,027 | 10/1987 | Marquis et al. | 502/171 |
| 4,758,681 | 7/1988 | Marquis et al. | 556/57 |
| 4,845,251 | 7/1989 | Marquis et al. | 549/529 |
| 4,891,437 | 1/1990 | Marquis et al. | 549/529 |
| 5,093,509 | 3/1992 | Meyer et al. | 556/57 |
| 5,101,052 | 3/1992 | Meyer et al. | 549/529 |

FOREIGN PATENT DOCUMENTS

| | | | |
|---|---|---|---|
| 1298253 | 11/1972 | United Kingdom | C07D 11/08 |
| 1317480 | 5/2973 | United Kingdom | C07D 1/08 |

Primary Examiner—Paul J. Killos
Attorney, Agent, or Firm—James L. Bailey; Kenneth R. Priem; Douglas H. May

[57] ABSTRACT

A process for recovery of molybdenum from residual fractions derived from an epoxidation reaction of propylene with tertiary butyl hydroperoxide in liquid phase with tertiary butyl alcohol, in the presence of soluble molybdenum, which process comprises:

Fractionating epoxidation reaction product for obtaining a liquid fraction containing essentially all molybdenum from the reaction product;

Contacting the liquid fraction with anhydrous ammonia for forming a precipitate containing the major portion of the molybdenum and a liquid phase containing 500 ppm or less molybdenum;

Separating the liquid phase from the precipitated solid;

Evaporating the liquid phase under conditions of elevated temperatures and reduced pressure in the presence of 1 to 3% water for separation into an evaporator overhead vapor essentially free of molybdenum and an evaporator concentrate comprising essentially all of the molybdenum fed to the evaporator;

Rapidly cooling evaporator concentrate from about evaporation temperature to about room temperature or less for converting the evaporator concentrate into a brittle, fracturable solid which is easier to accumulate and dispose of in an environmentally acceptable manner.

5 Claims, 1 Drawing Sheet

MOLYBDENUM RECOVERY

BACKGROUND OF THE INVENTION

1. Field of the Invention

The present invention relates to methods for recovering molybdenum from residual fractions derived from molybdenum catalyzed epoxidation processes. Particularly, the present invention relates to methods for removing molybdenum from liquid filtrates obtained from treating molybdenum containing epoxidation process residual fractions with ammonia for production of molybdenum-rich solid precipitates and liquid filtrates containing reduced amounts of molybdenum. More particularly, the present invention relates to improvements in evaporation processes where molybdenum-containing liquid filtrates are treated to produce evaporator overhead liquid condensates essentially free of molybdenum and evaporator concentrates containing essentially all the molybdenum from the liquid filtrates.

BACKGROUND

Processes for epoxidation of olefin with organic hydroperoxides in the liquid phase with a solvent for the reactants in the presence of soluble molybdenum catalysts are well known and widely practiced on a commercial basis. Olefins which may be effectively epoxidized in such processes are $C_3$-$C_{20}$ olefins. Olefins having substituents and/or internal double bonds are more reactive, and thus easier to epoxidize than alpha olefins. However, propylene oxide is a commercially desirable product, and propylene is widely employed as charge stock in these epoxidation processes.

Organic hydroperoxides employed as oxygen donors in the epoxidation reactions are generally the product of direct oxidation of hydrocarbons or substituted hydrocarbons having a secondary or tertiary hydrogen which is not adjacent to an unsaturated bond. In epoxidation reactions, the organic hydroperoxides donate an oxygen and are chemically reduced to their corresponding alcohols. Consequently, an organic hydroperoxide is generally chosen which is relatively inexpensive, or which produces a commercially useful alcohol by-product. In processes for epoxidation of propylene, tertiary butyl hydroperoxide is often the hydroperoxide of choice. Tertiary butyl hydroperoxide is relatively inexpensive to manufacture, and the tertiary butyl alcohol product is commercially useful, such as for charge stock in the manufacture of methyl tertiary butyl ether. Additionally, tertiary butyl alcohol is an effective solvent for reactants and products in the propylene epoxidation reaction such that the reaction zone solvent and alcohol by-product may be the same compound. Other particularly useful hydroperoxides are secondary amyl hydroperoxide, tertiary amyl hydroperoxide, ethyl benzene hydroperoxide and cumene hydroperoxide.

Molybdenum in a form soluble in the reaction mixture is preferred as catalyst in reactions for epoxidation of olefins with hydroperoxides. A wide variety of molybdenum organic complexes soluble in reaction mixtures and effective as epoxidation catalysts have been disclosed, as, for example, in U.S. Pat. Nos. 3,350,422; 3,434,975; 3,453,218; 3,573,226; 3,480,563; 3,578,690; 3,362,972; 3,784,482; 3,787,379; 3,953,362; 3,991,090; 4,009,122; 3,351,635; 4,891,437; and 4,650,868. Marquis, et al, in U.S. Pat. No. 4,626,596, discloses molybdenum-alkylene glycol complex epoxidation catalysts made by reacting an ammonium containing molybdenum compound with alkylene glycol in the presence of water at elevated temperatures.

As to the nature of the molybdenum complexes in the reaction zone, Atlantic Richfield Company, in British patent 1,317,480, disclose "Irrespective, however, of the particular molybdenum compound in molybdenum containing catalyst solutions which is utilized as catalyst in these epoxidation reactions, it has been found that the molybdenum forms a high molecular weight, highly complex compound which because of its low volatility is carried through the process in the bottoms fraction of each successive distillation utilized to recover and separate unreacted olefin, the olefin oxide product and the by-product alcohol resulting from the reduction of the organic hydroperoxide."

Methods for recovery of molybdenum values from epoxidation reaction product mixtures or non-distillate residual fractions have been proposed. Poenisch, in U.S. Pat. No. 4,485,074 discloses a process for recovery of molybdenum which comprises adding water to the epoxidation reaction mixture and heating the mixture for a time until molybdenum precipitates as a solid. The precipitated molybdenum is then separated from the remaining organic solution by solid liquid separation means.

Maurin, in U.S. Pat. No. 3,931,044 discloses three methods for recovering molybdenum from epoxidation reaction product distillate fractions. The first method comprises calcining the non-distillate fraction at a temperature less than 500° F. for a time to convert the molybdenum complex into solid molybdenum trioxide which is separated by solid liquid separation means and recovered for use in manufacturing catalyst by dissolving the molybdenum trioxide in aqueous ammonia. The second method consists of directly treating the molybdenum-containing organic fraction with aqueous ammonia, without prior calcining, and separating molybdenum from the organic fraction as a component of an aqueous phase. The third method disclosed by Maurin consists of directly treating the molybdenum containing fraction with gaseous ammonia for a time sufficient to precipitate the molybdenum as a solid which is then separated from the liquid fraction by solid-liquid separation processes.

Issacs, in U.S. Pat. No. 4,598,057, discloses a process for separating molybdenum from a heavy organic liquid bottoms fraction derived from an epoxidation reaction, which comprises heating the heavy organic liquid bottoms fraction with about 5 to 50 wt. % tertiary butyl alcohol at a temperature between about 150°-250° F. under pressure sufficient to maintain the liquid phase for a time sufficient to precipitate at least a portion of the molybdenum as a solid, and separating the solid molybdenum from the organic liquid bottoms fraction. Another method disclosed by Issacs for separating molybdenum from an epoxidation reaction heavy organic liquid bottoms fraction comprises adding sufficient water to the bottoms fraction to form a separate aqueous phase which is rich in molybdenum values, and heating the aqueous phase to precipitate the molybdenum as a solid which may be recovered by solid-liquid separation means.

Khuri, et al, in U.S. Pat. No. 3,763,303, discloses a multi-stage aqueous extraction process for extracting molybdenum from a non-distillate residue fraction obtained by fractional distillation of an epoxidation reaction product. The molybdenum is recovered from the aqueous phase by evaporating water, leaving a solid molybdenum-containing residue.

Atlantic Richfield, in British Pat. No. 1,317,480, discloses a method for removing molybdenum from an epoxidation reaction distillation bottom fraction by extraction with water or aqueous ammonia, and separating the molybdenum containing aqueous phase from the distillation bottom.

Meyer, et al, in U.S. Pat. No. 5,093,509 discloses a process comprising: treating an epoxidation reaction heavy liquid distillation fraction containing dissolved molybdenum catalyst with a precipitating agent such as ammonia to form a precipitate comprising most of the molybdenum and a liquid fraction containing the remainder of the molybdenum; separating the liquid fraction from the solid molybdenum precipitate; and passing the liquid fraction through a bed of amorphous magnesium silicate absorbent for a time sufficient for removal of remaining molybdenum from the liquid fraction.

Meyer, et al, in U.S. Pat. No. 5,101,052 discloses a process for removing molybdenum values from an epoxidation reaction heavy liquid distillation fraction where the fraction is adjusted, by addition of tertiary butyl alcohol, as required to maintain dissolved molybdenum concentration below 0.8 wt %, and then treating the fraction with anhydrous ammonia at elevated temperature and pressure to form a solid molybdenum precipitate and a liquid phase reduced in molybdenum content, and separating the solid molybdenum from the liquid phase by solid-liquid separation methods.

The methods above, for separating molybdenum from an epoxidation reaction product heavy liquid residual fraction, all obtain separation of a major portion of the molybdenum values from the liquid fractions. However, the remaining liquid fractions contain small amounts of molybdenum after separation of the major portion of the molybdenum.

Molybdenum compounds are somewhat toxic to livestock, and therefore, solutions containing molybdenum must be handled with care. Disposal of a liquid fraction may present a problem if the molybdenum content is sufficiently high to create an environmental hazard. Thus, it is desirable to remove essentially all molybdenum from heavy liquid residue fraction of epoxidation reaction products such that molybdenum-free liquid fractions may be disposed of and the separated molybdenum values may be recovered for disposal in an environmentally sound manner or for reuse in manufacturing catalyst, as desired.

Methods for separating essentially all molybdenum values from heavy liquid residual fractions of epoxidation reaction product are known.

Levine, U.S. Pat. No. 3,819,663, is directed to a method for treating an epoxidation reaction product heavy distillation fraction in a wiped-film evaporation process in order to recover molybdenum for recycle to the epoxidation reaction zone as make-up catalyst. Levine conducts his wiped-film evaporation process under conditions, including temperature in the range of 550°–650° F. (about 273°–330° C.) and about atmospheric pressure, to obtain an evaporation zone concentrate containing essentially all the molybdenum values from the heavy distillation fraction charged and an evaporation zone overhead vapor fraction essentially free of molybdenum. The evaporation zone concentrate when cooled may be redissolved in an organic solvent and circulated to the epoxidation reacting zone for use as catalyst make-up. The evaporation zone overhead vapor fraction, comprising about 85% or more of the heavy distillate fraction change, is essentially free of molybdenum and may be condensed to a liquid at room temperature and disposed of as a furnace fuel or used for other purposes such as recovery of individual components.

Sweed, U.S. Pat. No. 4,455,283, discloses a method for evaporating an epoxidation reaction product distillation residue under vacuum, in an evaporator comprising a heating zone and a vapor-liquid separation zone, to yield an evaporator concentrate rich in molybdenum and an evaporator vapor phase comprising organic compounds essentially free of molybdenum. According to Sweed, any water in the distillation residue is flash vaporized in the vapor-liquid separation zone before the distillation residue is subjected to heating. By this means, precipitation of molybdenum in the evaporator and concomitant plugging of equipment is avoided. The evaporator vapor phase may be condensed for recovery. The evaporator concentrate comprises molybdenum values and substantial amounts of heavy organic residues.

Thus, in these evaporation methods disclosed in Levine and in Sweed, molybdenum values from the evaporation reaction product may be recovered separate from the organic liquids. At least in Levine, the molybdenum values may be recovered as a solid product. In both Levine and Sweed, the evaporator vapor fractions (subsequently condensed) are essentially free of molybdenum.

While these evaporation methods represent important advances with respect to molybdenum recovery from distillation residues obtained from epoxidation reaction products, further improvements in the molybdenum recovery techniques are desirable.

SUMMARY OF THE INVENTION

Now, according to the present invention, an epoxidation reaction product residual fraction comprising soluble molybdenum epoxidation catalyst, unreacted hydroperoxide, by-product alcohol and side reaction products is treated for separation into molybdenum containing solids suitable for molybdenum recovery or for disposal in an environmentally sound way, and into molybdenum-free organic liquid fractions suitable for disposal, as in boiler fuel, or for further treatment to recover useful products therefrom.

Accordingly, in one embodiment, the process of the present invention comprises:

reacting a molybdenum catalyst containing epoxidation reaction product residual fraction with ammonia in a precipitation zone for forming a solid precipitate containing a major portion of the molybdenum and forming a liquid filtrate containing a minor portion of the molybdenum;

separating, in a solid-liquid separation zone, the molybdenum containing precipitate from the filtrate;

evaporating the filtrate in an evaporation zone, at an elevated temperature and reduced pressure for producing an evaporator overhead liquid product essentially free of molybdenum and an evaporator concentrate containing essentially all molybdenum from the filtrate;

recovering the evaporator overhead liquid product for disposal or further treatment, as desired; and recovering evaporator concentrate for molybdenum recovery or disposal, as desired.

wherein, the improvement of the present invention comprises:
a) maintaining about 1 to 3 wt % water in the evaporator overhead product for preventing deposition of solid ammonium salts therefrom; and
b) rapidly cooling the evaporator concentrate from an elevated temperature of at least about 100° C., and preferably from the evaporation zone temperature, to about room temperature or less, at a rate of at least about 5° C./minute sufficient to convert the evaporator concentrate into a brittle, non-tacky solid which is easily broken and removed from the process equipment for recovery or disposal of the molybdenum in an environmentally sound manner.

BRIEF DESCRIPTION OF THE DRAWING

In the drawing, the FIGURE is a schematic representation of a preferred epoxidation reaction and purification process embodying the present invention.

DESCRIPTION OF THE PREFERRED EMBODIMENT

Figure 1:
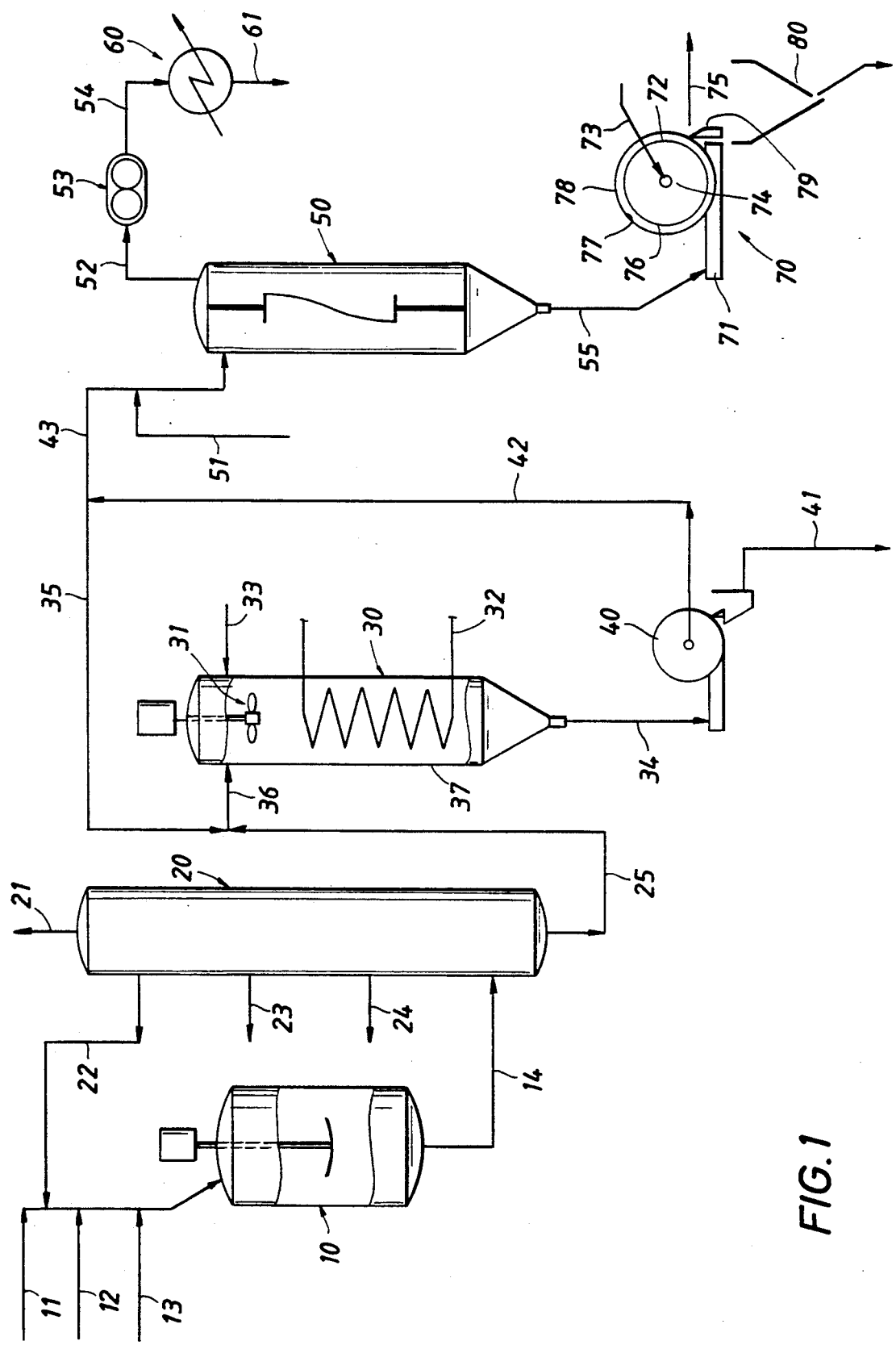

Turning now to the drawing. Olefin reactant via line 11, hydroperoxide reactant via line 12, and soluble molybdenum catalyst via line 13 are charged into epoxidation reaction zone 10. The olefin reactant may be a substituted or unsubstituted olefin of 3-20 carbon atoms, and is preferably propylene.

The organic hydroperoxide charged to reaction zone 10 via line 12 may be any hydroperoxide which will donate oxygen to the olefin reactant under the epoxidation reaction conditions. Preferably the hydroperoxide is selected from tertiary butyl hydroperoxide and tertiary amyl hydroperoxide. The hydroperoxide is provided to epoxidation reaction zone 10 in solution with an organic solvent. Commonly, and preferably, the solvent is the alcohol which corresponds to the chemically reduced hydroperoxide. Preferably, the tertiary butyl hydroperoxide charged via line 12 is about 40 to 75 wt. % tertiary butyl hydroperoxide in solution with butyl tertiary butyl alcohol.

The molybdenum catalyst charged to epoxidation reaction zone 10 via line 13 is in an amount to provide from about 50 to 1000 ppm molybdenum in the epoxidation reaction mixture and preferably from about 200 to 600 ppm. The molybdenum catalyst is selected from any of the wide choice of soluble molybdenum compounds which exhibit good catalytic properties for epoxidation of olefins. Examples of suitable molybdenum catalysts include molybdenum compounds such as molybdenum octoate, molybdenum naphthenate, molybdenum acetyl acetonate, molybdenum-alcohol complexes, molybdenum-glycol complexes, complexes of alkylene glycols with ammonium-containing molybdenum compounds as disclosed in U.S. Pat. No. 4,626,596, molybdenum complexes of monohydric alcohols as described in U.S. Pat. No. 4,650,886, ammonium-molybdate-alkanol complexes as described in U.S. Pat. No. 4,654,427, or catalysts as described in U.S. Pat. No. 4,703,027 and U.S. Pat. No. 4,758,681. Other soluble molybdenum catalysts useful in the epoxidation of olefins, and which may be treated according to the method of the present invention will occur to those skilled in the art of this invention.

In reactor 10, the epoxidation reaction is preferably of the type known to the art wherein propylene is reacted with tertiary butyl hydroperoxide under reaction conditions including a reaction temperature in the range of about 180°-300° F. (82°-149° C.) and a pressure in the range of about 300 to 1000 psig. for a time, in the range of about ¼ to 2.5 hours, sufficient for conversion of a major portion of the tertiary butyl hydroperoxide and for production of propylene oxide. Such epoxidation reactions, for example as disclosed in Kollar, U.S. Pat. No. 3,351,635 and elaborated in British Pat. No. 1,298,253; or as disclosed in Marquis et al, U.S. Pat. No., 4,891,437. See also, Marquis et al, U.S. Pat. No. 4,845,251.

Epoxidation reaction product mixtures formed when propylene is reacted with tertiary butyl hydroperoxide in solution with tertiary butyl alcohol in the presence of a soluble molybdenum catalyst normally yield epoxidation reaction products comprising propylene oxide and tertiary butyl alcohol as well as unreacted propylene and tertiary butyl hydroperoxide, hydrocarbon impurities, such as propane, from the reaction charge stock, dissolved molybdenum catalyst, and a variety of side reaction products. Side reaction products include: hydrocarbons containing six or more carbon atoms such as olefin dimers (hexenes); $C_1$-$C_4$ carboxylic acids such as acetic, formic and isobutyric acids; $C_1$-$C_4$ alcohols; esters, such as methyl formate; ketones such as acetone; aldehydes such as acetaldehyde; and water and high boiling organic residue compounds. Similar reaction mixtures, accounting for differences in charge stocks, are obtained when olefins other than propylene or organic hydroperoxides other than tertiary butyl hydroperoxide are employed. The impurities and side reaction products are present in the epoxidation reaction product in relatively low concentrations. Such epoxidation reaction mixtures are usually separated by distillation into a plurality of distillate fractions and a residual non-distillate fraction. For propylene epoxidation with tertiary butyl hydroperoxide, the distillate fractions of the epoxidation reaction product include a propane impurity fraction, an unreacted propylene fraction, and a tertiary butyl alcohol fraction, which are all essentially free of molybdenum. The non-distillate residual fraction contains essentially all of the molybdenum from the epoxidation reaction product as well as unreacted tertiary butyl hydroperoxide and side reaction products.

From epoxidation zone 10, epoxidation reaction product is charged via line 14 to distillation zone 20 where the reaction product is fractionated into desired fractions according to methods well known in the fractionation art.

A light fraction (propane and lighter) is withdrawn from distillation zone 20 via line 21 for disposal. A propylene fraction is withdrawn and is conveniently recycled to reactor 10 via line 22.

Propylene oxide fraction is withdrawn from distillation zone 20 via line 23 for recovery as a product.

Tertiary butyl alcohol fraction is withdrawn from distillation zone 20 via line 24 for recovery as a product or for use as solvent for additional tertiary butyl hydroperoxide charge to epoxidation reaction zone 10.

A heavy non-distillate residual fraction is discharged from distillation zone 20 via line 25. This residual fraction contains substantially all the molybdenum catalyst withdrawn from reaction zone 10 in the epoxidation reaction product. The heavy residual fraction contains other components in addition to molybdenum catalyst. These other components include tertiary butyl hydroperoxide, tertiary butyl alcohol and side-reaction products including hydrocarbons and oxygenates such as acetaldehyde, acetone, isopropyl alcohol, propylene glycol tertiary butyl ether, etc. and carboxylic acids such as formic acid, acetic acid, and iso-butyric acid.

Although molybdenum is present in reaction zone 10 in an amount in the range of 50 to 1000 ppm, and usually in the range of about 200 to 600 ppm, the molybdenum is progressively concentrated in the epoxidation reaction product distillation zone 20 into a non-distillate residual fraction, and is normally present in amounts of about 0.03 to 2.5 wt % (300 to 25,000 ppm).

Composition of a typical non-distillate residual fraction from a propylene epoxidation reaction product is shown in Table 1.

TABLE I

| COMPOSITION OF NON-DISTILLATE FRACTION | |
|---|---|
| Component | Concentration, wt % |
| Impurities lighter than TBA* | 0.1–2 |
| TBA* | 70–90 |
| Impurities heavier than TBA* but lighter than TBHP* | 1–4 |
| TBHP* | 2–20 |
| Impurities heavier than TBHP* | 3–12 |
| Molybdenum Concentration | 300–20,000 ppm |

*TBA is tertiary butyl alcohol; TBHP is tertiary butyl hydroperoxide

A non catalytic precipitation reaction may be conducted according to the methods disclosed by Meyer et al in U.S. Pat. No. 5,101,052, which is incorporated herein by reference. Meyer et al, in U.S. Pat. No. 5,101,052, discovered that when an epoxidation reaction product residue fraction containing less than 8000 ppm molybdenum was treated with ammonia, the precipitation of molybdenum from the distillation residue fraction was substantially complete, with the major portion of the molybdenum going into the solid precipitate and with the remaining liquid phase containing only a small amount of the molybdenum, in the range of about 100 ppm or less. However, when the distillation residue fraction contained greater than 8000 ppm molybdenum, a large portion of the molybdenum did not precipitate and remained in solution in the liquid phase. Thus, according to the teaching of Meyer, et al, in the event the molybdenum concentration in a distillation residue fraction exceeds about 8000 ppm, then the distillation residue fraction is preferably diluted with an organic diluent, for adjusting the concentration of molybdenum to less than about 8000 ppm, before charging the distillation residue fraction to a precipitation reaction, such that upon contact with the ammonia precipitation agent, a major portion of the molybdenum will precipitate and only a minor portion of the molybdenum will remain in solution in the liquid phase.

Molybdenum-containing non-distillate residual fraction, in accordance with the present invention, passes from distillation zone 20 into precipitation zone 30 via line 25 and is combined with filtrate recycle from line 35 to form a precipitation zone charge containing less than 8000 ppm molybdenum. Precipitation zone charge in line 36 flows into reactor 37. A reaction vessel 37 equipped with suitable agitation means, such as on impeller 31, and suitable temperature control means, such as coils 32, through which a heat exchange medium may be circulated. Ammonia for precipitating molybdenum from the precipitation zone charge is charged to precipitation reaction vessel 37 via line 33.

In precipitation zone 30, and reaction vessel 37, precipitation zone charge, containing molybdenum, is contacted with ammonia in at least an equimolar amount, based upon molybdenum content to form a precipitation zone reaction mixture. Preferably ammonia is present in molar excess, and more preferably is present in an amount sufficient to saturate the precipitation zone reaction mixture. The ammonia is preferably anhydrous to minimize the water content of the precipitation zone reaction mixture and particularly to avoid formation of an aqueous phase in precipitation zone 30. Suitably, the ammonia may be brought into contact with precipitation zone charge with agitation under ambient temperature and pressure conditions. Although, higher temperatures and pressures may be used. For example, temperatures in the range of about 20°–250° C., and pressures in the range of about 0 to 3000 psig. Reaction time in precipitation zone 30 will be in the range of about 0.2 to 2 hours, sufficient to insure a substantial reaction of ammonia with molybdenum and to insure precipitation of molybdenum containing solids.

Precipitation zone reaction product is discharged from precipitation reaction vessel 37 via line 34 to a solid-liquid separation zone 40 wherein the reaction product is separated into a molybdenum-containing solid and a liquid filtrate. Separation means in solid-liquid separation zone 40 may be any convenient means such as settling, decanting, centrifuging, or filtration. Filtration, especially on a rotary drum filter, is preferred since the proportion of solid precipitate compared to liquid filtrate will be low, such that filtration will proceed rapidly and provide good separation of solids from liquid filtrate.

From solid-liquid separation zone 40, solids are removed via line 41. Solids, when recovered from solid-liquid separation zone 40 as a filter cake will contain about 40–60 wt % molybdenum. These solids are in a form suitable for charge to a molybdenum catalyst manufacturing process, charge to a molybdenum metal recovery process, or to disposal in an environmentally sound manner.

Liquid filtrate, substantially free of solid material and containing a small amount of molybdenum, preferably less than about 100 ppm, and more preferably less than about 10–150 ppm, is withdrawn from solid-liquid separation zone 40 via line 42. A portion of liquid filtrate from line 42 may be recycled via line 35 for mixture with non-distillate residual fraction in line 36 in an amount sufficient for production of a precipitation zone charge containing less than 8000 ppm molybdenum, as is described above.

The portion of liquid filtrate which is not recycled is passed from line 42 via line 43 into evaporation zone 50.

Evaporators are items of process equipment in which a liquid is brought into contact with a heated surface under conditions where a portion of the liquid is vaporized and the vapor is removed, generally without reflux or recycle, leaving behind an evaporator concentrate. Evaporators are commonly used for separating vaporizable materials from heat sensitive materials. In such cases, a thin film of the liquid charge may be brought into contact with the heated surface. The thin film increases the rate of vaporization of volatile materials, and reduces the time heat sensitive materials are in contact with the heated surface. Also, evaporators are commonly operated at reduced pressures such that volatile materials vaporize at lower temperatures and consequently heat sensitive materials may be exposed to lower temperatures during the evaporation process.

For situations where evaporator concentrates remaining after vaporization of volatile materials are viscous liquids or pastes, evaporators with wipers or mechanical scrapers on the heated surfaces are often used. One type of evaporator particularly useful in the present invention is a wiped film evaporator. The wiped film evaporator is a thin film evaporator with mechanical wipers, or blades, which provide the thin film of liquid with turbulence. Also, as the liquid in the evaporator becomes more viscous, the wipers direct the viscous material to the evaporator outlet.

A wiped film evaporator comprises a large tube, generally vertical. The tube is heated to evaporation temperatures, by means such as steam, etc., on its outer surface. The inner portion of the tube is fitted with wipers, or blades, which are arrayed longitudinally in contact with the tube inner surface. The wipers rotate about the axis of the tube, and thus wipe the inner surface of the tube.

Liquid charge stock enters the top of the tube and is allowed to flow down the inner surface. This liquid is spread out into a thin, highly turbulent film by the wiping action of the wipers rotating inside the tube. As the liquid descends down the tube, contact with the heated surface vaporizes volatile components, and non-volatile concentrate is pushed to the lower end of the tube by action of the blades. Concentrate is removed from the bottom of the evaporator, and vapors are generally removed from the top.

Heat transfer is substantially enhanced in the turbulent thin film created by action of the wipers. Thus, vaporization of volatile components is enhanced. The wiping action of the wipers push the non-volatile concentrate to the bottom the evaporator, thereby reducing the time the concentrate is in contact with the hot tube wall.

In the present invention, evaporation zone 50 is operated at evaporation conditions including temperatures in the range of about 100° to 250° C. and pressures, in the range of about 1 to 100 mm Hg absolute, sufficient to vaporize about 80 to 95 wt percent of the filtrate charge as evaporator overhead vapor.

In evaporation zone 50, evaporator overhead vapor flows via line 52 through vacuum pump 53 and line 54 into condenser 60. In condenser 60, the evaporator overhead vapor is substantially completely condensed into an overhead liquid product.

Vacuum pump 53 may be any pump means capable of producing the desired absolute pressure in the evaporation zone. For example, vacuum pump 53 may be a mechanical pump such as a lobe-type or vane-type vacuum pump, or it may be a venturi jet located downstream from condenser 60.

Condenser 60 may be any convenient condenser capable of condensing substantially all of the evaporator overhead vapor, and may be, for example, a water cooled or an air cooled condenser.

Evaporator overhead liquid product in line 61 is essentially free of molybdenum and comprises organic compounds from the epoxidation reaction product nondistillate residue charged to precipitation zone 30, as described above. However, where anhydrous ammonia is used as precipitating agent in precipitation zone 30, we have found that the evaporator overhead may contain ammonium salts such as ammonium carbonate/ammonium carbamate which may deposit in evaporation zone 50 overhead, lines 52 and 54 and condenser 60, and/or may occur as solids in evaporator overhead liquid in line 61.

These solid ammonium salts, if allowed to accumulate, may plug process equipment or may force shutdown of the process equipment for cleaning to avoid plugging. It is not clear whether these ammonium salts are formed in precipitation zone 30 and are subsequently volatilized under operating conditions of reduced pressure and elevated temperature found in evaporation zone 50, or whether ammonia, or volatile ammonium compounds carried into evaporation zone 50 with liquid filtrate charge reacts with other components of the evaporator overhead vapor to form the salts. While the exact mechanism by which the ammonium salts are formed and deposited in the evaporator overhead liquid is not fully understood, we have discovered a method for preventing deposition of the solid salts.

According to an improvement of the present invention, we have discovered that deposition of solid ammonium salts in the evaporator 50 overhead, connecting lines 52 and 53 and/or condenser 60 of the present process may be prevented by maintaining from about 1 to 3 wt % water in the evaporator overhead vapor exiting evaporation zone 50. Less than about 1% water may be insufficient to prevent deposition of the solid salts, and more than 3% water in the vapor does not appear necessary to prevent deposition of the solid salts. The water may be introduced into the evaporation zone 50 at a convenient place, such as injection via line 51 into the liquid filtrate feed to evaporator 50, as shown in the drawing. Evaporator overhead liquid product in line 61, containing the small amount of water and free of solids and molybdenum may be disposed of as boiler fuel, or if desired, may be treated further to recover components such as tertiary butyl alcohol.

In evaporator 50, an evaporator concentrate comprising unvaporized residue of liquid filtrate charge and containing essentially all of the molybdenum charged to the evaporation zone 50 is recovered via line 55. At evaporation temperatures, the evaporator concentrate is a viscous liquid. If it cools to room temperature slowly, however, the concentrate tends to form an amorphous mass which sticks to process equipment and is difficult to handle and recover.

We have discovered a method for cooling the evaporator concentrate to convert it from a viscous liquid at evaporator temperatures to a brittle solid which fractures readily into small solid pieces at room temperature. This brittle solid may then easily be broken up and accumulated for further processing, such as recovery of molybdenum, or for disposal in an environmentally sound manner. As desired, the brittle solid concentrate may be broken into smaller pieces for convenient handling. Thus, according to an improvement of the present invention, the viscous liquid evaporator concentrate is cooled rapidly at a rate of at least 2° C./min., and preferably in the range of 5°-10° C./min. from evaporator temperatures in the range of about 100° C. to 250° C. to temperatures in the range of about 0° to 30° C., forming a brittle solid as opposed to a sticky tar or glassy amorphous mass.

We have observed, when the evaporator concentrate is allowed to cool in the air at ambient conditions, from evaporator temperatures (100–250 deg. C.) to room temperatures (20–30 deg. C.), the initial cooling rate is fairly rapid, but the cooling rate slows perceptibly as the concentrate temperature approaches ambient temperature. Under these conditions the evaporator concentrate does not solidify into a brittle solid. Rather, the evaporator concentrate cools in air into a sticky tar, or a glassy amorphous solid, either of which adheres tightly to its container. We discovered that increasing the rate of cooling for the evaporator concentrate from evaporation temperatures to ambient room temperature or below caused the evaporator concentrate to form a cooled brittle solid which did not adhere tightly to its container and which could be easily broken into smaller pieces.

Evaporator concentrate, when allowed to cool in air from evaporation temperatures (100–250 deg. C.) to room temperatures (20–30 deg. C.), initially cools rapidly. However, as the evaporator concentrate approaches room temperature, the rate of cooling slows perceptibly and the evaporator concentrate will remain warm (40–50 deg. C.) for an extended period. In some cases, for several hours.

The mechanism by which rapid cooling causes evaporator concentrate to form a brittle solid, whereas slow cooling causes evaporator concentrate to form an amorphous, sticky solid, is not well understood, and we do not wish to be bound by any theory of how such mechanism operates. However, an analogy may be drawn between the two cooling methods and other slow quench and fast quench processes. In slow quench process for other materials, such as metals and some crystals, the solid undergoes an annealing process as it is slowly quenched. Internal stresses are relieved, and the solid becomes, at once, softer and tougher. On the other hand, quenching such materials rapidly traps internal stresses within the structure of the solids, and the solids become harder and more brittle. Following this analogy, increasing the rate of cooling during the slow-cooling period when the evaporator concentrate cools from a warm stage (40–50 deg. C.) to room temperature (20–30 deg. C.) may prevent the evaporator concentrate from annealing and forming a soft, sticky solid.

Cooling the evaporator concentrate fairly rapidly from evaporation temperatures to room temperatures, forms the evaporator concentrate into a brittle solid. The cooling rate does not need to be extremely rapid, and rates of about 2 deg. C. per minute appear adequate, so long as the rate is maintained constant and the evaporator concentrate is not allowed to remain at the warm stage for an extended period of time. Cooling rates in the range of 5–10 deg. C. per minute are preferred. More rapid rates may be used, but are not required.

The cooling process may be carried out by any convenient means where the evaporator concentrate can be distributed into a relatively thin film, or layer, which is then rapidly cooled to ambient temperatures or lower. For example, the evaporator concentrate may conveniently be cooled and flaked in a continuous flaker, such as a revolving drum, revolving table, or traveling belt flaker. Revolving drum flakers are the most common commercial equipment and the description of the cooling process of the present invention will be made with reference to such a revolving drum flaker.

In the drawing, evaporator concentrate at about evaporation temperature flows from line 55 into feed pan 71 of rotary flaker 70. In feed pan 71, evaporator concentrate is held at a temperature sufficient to maintain the concentrate in the liquid state. From pan 71, a thin film of concentrate is picked up on the surface of a rotating drum 72 as it revolves through the liquid concentrate in pan 71. Pan 71 may be of any conventional material, such as metal which is not substantially corroded by the hot liquid concentrate. Generally, pan 71 will be heated, by means such as a steam jacket or heating coil, to insure that the evaporator concentrate remains in the liquid phase until picked up on the surface of drum 72.

Drum 72 is cooled by a coolant such as water, chilled brine or directly expanding refrigerant. Coolant is admitted to the interior of drum 72 via line 73 through a hollow trunion 74. After cooling drum 72, coolant is withdrawn through the other trunion (not shown) and line 75. Drum 72 is metal, preferably one such as stainless steel, which is not subject to corrosion by the hot liquid concentrate. Drum 72 may be provided with interior baffles 76 which define an annular space at the interior surface 77 of drum 72. Coolant flows through the annular space, entering through trunion 74 and leaving through the other trunion (not shown). Alternatively, coolant may be sprayed directly on the interior surface 77 of drum 72, in which case interior baffles are not required.

Evaporator concentrate in pan 71 is picked up on the outer surface 78 of drum 72 for rapid cooling into a brittle solid which can be flaked into small pieces which are easy to recover and dispose of. The chilled concentrate adheres to rotating drum surface 78, and is removed by a knife (or doctor blade) 79 pressed firmly against drum surface 78. The flaked, solid concentrate dislodged by knife 79, in small easily handled pieces, falls into hopper 80. From hopper 80 the flaked concentrate, containing essentially all molybdenum from filtrate charged to evaporation zone 50, may be recovered for further treatment for recovery of molybdenum or for disposal in an environmentally sound manner.

EXAMPLES

In the process of epoxidizing propylene to propylene oxide, using tertiary butyl hydro-peroxide as oxygen donor, a soluble molybdenum catalyst is used in the reaction solution. The molybdenum catalyst leaves the epoxidation process along with unreacted hydroperoxide and higher molecular weight side-reaction products as a component of a non-distillate residual stream.

As has previously been found (U.S. Pat. No. 5,093,509 and No. 5,101,052), a major portion of the molybdenum values can be precipitated from the residual stream by reaction with ammonia in the liquid phase. The molybdenum containing solid precipitate (40–60% molybdenum) can be removed from the liquid filtrate by solid-liquid separation means such as filtration. Low levels of molybdenum in the filtrate, in the range of 50–250 ppm have been achieved by this method. This filtrate can be concentrated via evaporation, forming an overhead liquid product essentially free of molybdenum and an evaporator concentrate containing about 500–5000 ppm molybdenum.

In performing the above processes, we found that solids formed in the evaporator overhead product. These solids were analyzed and were found to be ammonium carbonate/ammonium carbamate salts. Also, we found that the evaporator concentrate, when allowed to cool slowly in air to room temperature, formed an amorphous or tarry mass which could not be easily removed from the container.

According to our invention, we discovered that addition of small amounts of water to the evaporator or evaporator overhead prevented deposition of the solid ammonium salts in the evaporator condenser system. Also, we found that rapid cooling of evaporator concentrate to room temperature or below produced a brittle, fracturable solid which was easily broken up for easy removal from the process equipment.

The present invention is illustrated by the following specific examples which are given solely by way of illustration and not as limitations on the scope of the invention.

EXAMPLE I

In this comparative example, filtrate from ammonia precipitation of propylene epoxidation reaction product residual fraction containing 120 ppm molybdenum was charged to a pear-shaped glass flask and subjected to rotary evaporation at 150°-160° C. and 2.5 mm Hg absolute pressure until 93 wt % of the material charged was taken as overhead and the remainder was recovered as a molybdenum-containing evaporator concentrate. Molybdenum in the overhead product was at or near the analytical detection limit (<1 ppm). During the evaporation, however, solids formed in the overhead condenser system which, upon analysis, were found to be ammonium carbonate/carbonate salts.

The evaporator concentrate, comprising about 1700 ppm molybdenum, upon sitting and slowly cooling in the flask to room temperature, formed an amorphous mass which stuck to the flask and was difficult to remove. Upon removal of the evaporator concentrate from the flask with a spatula, brown deposits remained adhered to the wall of the flask.

EXAMPLE II

In this example, the filtrate used in Example I, containing 120 ppm molybdenum, was charged to a pear-shaped glass flask and subjected to rotary evaporation at a temperature of 220° C. and pressure of 60 mmHg absolute for a time until 94 wt % of the filtrate was taken as overhead product. Upon condensing, solid ammonium salts formed in the overhead condenser system. Addition of 3 wt % water to the overhead product at room temperature dissolved the solid salts. Any molybdenum in the overhead product was at or near the analytical detection limit (<1 ppm).

The evaporator concentrate, comprising 6 wt % of the filtrate charge and essentially all of the molybdenum was cooled in the flask, in a bath of dry ice and acetone, from evaporation temperature (220° C.) to about room temperature (25° C.) in about 20 minutes at a cooling rate of about 10° C./minute. The cooled concentrate formed a brittle fracturable solid which was easily broken up with a spatula for easy and complete removal from the flask.

EXAMPLE III

In this example, filtrate used in Example I, containing 120 ppm molybdenum, was charged to a pear-shaped glass flask and subjected to rotary evaporation at a temperature of 210° C. and a pressure of 8 mm Hg absolute until 90 wt % of the filtrate was taken as overhead vapor product.

The evaporator concentrate was allowed to cool in the flask overnight to room temperature. The room temperature evaporator concentrate formed an amorphous mass which stuck to the flask. The concentrate at room temperature in the flask was further cooled in a dry ice-acetone bath, but attempts to fracture the amorphous mass were unsuccessful.

The concentrate in the flask was briefly reheated in a bath of hot water to a temperature of about 100° C., then rapidly cooled in a dry ice-acetone bath to about room temperature (20° C.) in about 8 minutes for a cooling rate of about 10°/minute. This time, the cooled concentrate formed a brittle solid which readily fractured with action by a spatula for complete and easy removal from the flask.

EXAMPLE IV

In this example, three portions of filtrate used in Example I were prepared with respectively 3 wt %, 2 wt % and 1 wt % water (basis total weight of the filtrate to be evaporated) added to the portions before evaporation. Each portion was charged to a pear-shaped flask and subjected to rotary evaporation at a temperature of 210° C. and a pressure of 10 mm Hg absolute until about 90 wt % of the filtrate charge was taken as overhead product.

No solids formed in the overhead product from any of the three portions subjected to evaporation, and any molybdenum was present at or below the level of analytical detection (<1 ppm).

Evaporator concentrate from each portion, when cooled from evaporation temperatures (210° C.) to room temperature at a rate of about 10°/minute in a dry ice acetone bath, formed brittle solids which were all easily flaked by a spatula for complete removal from the walls of the flask.

The results obtained in the examples shows the advantages of the present invention. Evaporation of a molybdenum containing filtrate from an ammonia precipitation reaction allows recovery of an overhead product essentially free of molybdenum and recovery of an evaporator concentrate containing essentially all the molybdenum from the filtrate charge. Addition of about 1 to 3 wt % water to the filtrate prevents deposition of solid ammonium salts in the evaporator overhead condenser system.

Rapid cooling, at a rate of about 10° C./minute, of the evaporator concentrate from a temperature of at least about 100° C., and preferably from about the evaporation temperature to about room temperature or less, causes the evaporator concentrate to form a brittle solid which can be flaked or broken up for easy and complete removal from process equipment.

Modifications, variations and changes may be made by one skilled in the art of this invention without departing from the spirit and scope thereof, which is defined in the appended claims.

We claim:

1. In a method for recovering molybdenum values from the liquid portion of an ammonia-treated, non-distillate residual fraction from a process for epoxidation of olefin with organic hydroperoxide in the presence of a molybdenum catalyst, wherein the ammonia-treated liquid residual fraction is heated to a temperature in the range of about 100° to 300° C. at a pressure in the range of about 1 to 100 mmHg, absolute, in an evaporation zone for forming an evaporator overhead vapor fraction essentially free of molybdenum and comprising about 80 to 95 wt % of the residual fraction, and an evaporator concentrate containing essentially all the molybdenum in the ammonia-treated liquid residual fraction, the improvement which comprises:

(a) maintaining 1 to 3 wt % water in the evaporator overhead vapor fraction sufficient to prevent deposition of solid ammonium salts therefrom; and (b) rapidly cooling the evaporator concentrate fraction from evaporation temperatures to about room temperature at a rate of at least about 2° C. per minute, sufficient to convert the evaporator concentrate into a brittle, non-tacky solid at room temperature.

2. The method of claim 1, wherein the olefin is propylene and the organic hydroperoxide is tertiary butyl hydroperoxide.

3. A method for separating molybdenum from an organic liquid which contains soluble molybdenum catalysts, which method comprises:
   diluting the molybdenum containing organic liquid with an organic solvent to maintain molybdenum concentration less than 8000 ppm in the diluted liquid;
   reacting diluted organic liquid with an excess of anhydrous ammonia in the liquid phase, at a temperature of about 20° to 250° C. for a time in the range of about 0.2 to 2.0 hours for precipitating a major portion of the molybdenum as solid;
   separating the precipitated solid molybdenum from the ammonia treated organic liquid;
   evaporating, in an evaporation zone, about 80 to 95% of the ammonia treated organic liquid;
   forming an evaporation zone overhead liquid essentially free of molybdenum and an evaporation zone concentrate containing essentially all of the molybdenum in the ammonia treated organic liquid;
   maintaining about 1—3 wt % water in the evaporation zone over head for preventing deposition of solid ammonium salts therefrom; and
   rapidly cooling evaporation zone concentrate from evaporation temperatures to room temperature or less, at a rate of at least about 2° C. per minute, sufficient for converting hot evaporation concentrate into a brittle,
   non-tacky solid at room temperature.

4. The method of claim 3, wherein the organic liquid is a non-distillate fraction of a reaction product from an epoxidation process wherein an olefin is reacted with an organic hydroperoxide in solution with an organic solvent in the presence of a soluble molybdenum catalyst.

5. The method of claim 4, wherein the olefin is propylene, the organic hydroperoxide is tertiary butyl hydroperoxide, and the organic solvent is tertiary butyl alcohol.

* * * * *